United States Patent
Hoffman et al.

[11] Patent Number: 6,029,987
[45] Date of Patent: Feb. 29, 2000

[54] FRONT AXLE FOR A MOTOR VEHICLE

[75] Inventors: Martin Hoffman, Vaihingen; Walter Schaible, Hemmingen, both of Germany

[73] Assignee: Dr. Ing. H.C.F. Porsche AG, Germany

[21] Appl. No.: 09/083,976

[22] Filed: May 26, 1998

[30] Foreign Application Priority Data

May 26, 1997 [DE] Germany .......................... 197 21 878

[51] Int. Cl.[7] ................................................. B60G 11/02
[52] U.S. Cl. ........................... 280/124.171; 280/124.175; 267/260
[58] Field of Search ..................... 280/124.171, 124.175, 280/124.17; 267/36.1, 260

[56] References Cited

U.S. PATENT DOCUMENTS

| | | | |
|---|---|---|---|
| 3,181,641 | 5/1965 | Haddad | 280/124.171 |
| 4,540,197 | 9/1985 | Finn et al. | 280/124.171 |
| 4,619,466 | 10/1986 | Schaible et al. | 280/124.171 |
| 4,854,606 | 8/1989 | Ke Goncourt et al. | 280/124.175 |
| 5,141,209 | 8/1992 | Sano et al. | 267/260 |
| 5,251,930 | 10/1993 | Kusaka et al. | 280/124.171 |
| 5,826,896 | 10/1998 | Baumann | 280/124.171 |

FOREIGN PATENT DOCUMENTS

| | | |
|---|---|---|
| 1 924 175 | 3/1973 | Germany . |
| 33 34 623 A1 | 4/1985 | Germany . |
| 40 19 796 A1 | 1/1992 | Germany . |

*Primary Examiner*—Christopher P. Ellis
*Attorney, Agent, or Firm*—Evenson McKeown Edwards and Lenahan P.L.L.C.

[57] ABSTRACT

A front axle for a motor vehicle is connected with a leaf spring mounted transversely to the vehicle. The spring is mounted on a cross member by elastic bearings located on both sides of a lengthwise central axis of the vehicle, and connected by these bearings to the vehicle body. A leaf spring is connected at its free ends with an A-arm and is mounted pivotably on a cross member secured to the body. Between the two pivot bearings of the A-arm in the cross member, the leaf spring is secured elastically in a spring bearing.

10 Claims, 3 Drawing Sheets

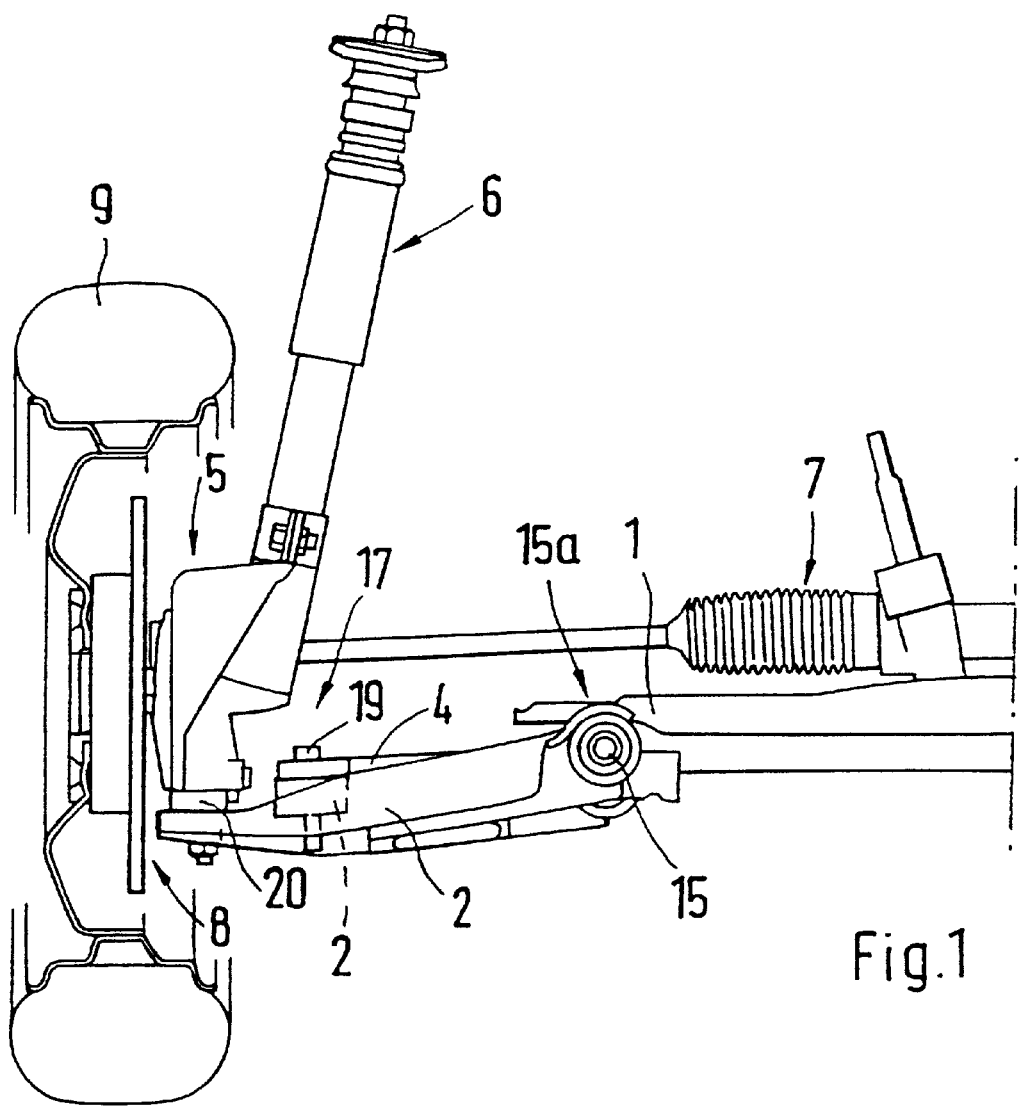
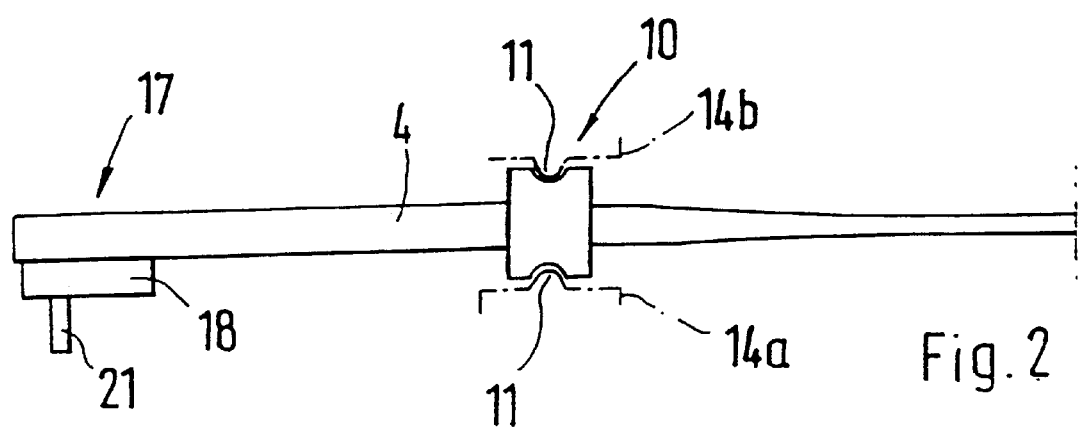

FRONT AXLE FOR A MOTOR VEHICLE

BACKGROUND AND SUMMARY OF THE INVENTION

This application claims the priority of German application 197 21 878.4, filed May 26, 1997, the disclosure of which is expressly incorporated by reference herein.

The present invention relates to a front axle for a motor vehicle, and more particularly, to a front axle with a spring disposed transversely to the vehicle and mounted to a cross member by way of elastic bearings located on both sides of a lengthwise central axis of the vehicle, the spring connected by these bearings with the vehicle body.

A transversely mounted leaf spring for a motor vehicle as a wheel guidance element is described in U.S. Pat. No. 3,181,641. This leaf spring is rectangular, and is mounted elastically and pivotably in retaining elements on both sides of the central axis of the vehicle. The retaining elements are connected with a side member, and the free ends of the leaf springs are connected with a pivot bearing. For wheel guidance, a wheel locator arm is likewise connected with the pivot bearing.

An object of the present invention is to provide an improved front axle for a motor vehicle with a transverse leaf spring which permits exact wheel guidance and is composed of parts that can be assembled in a simple manner.

This object has been achieved according to the present invention by providing that free ends of leaf spring are each connected with an A-arm and are mounted pivotably on a cross member secured to the body, the leaf spring being held elastically in a spring bearing between pivot bearings of A-arm in a cross member.

The primary advantages achieved with the present invention include the fact that the connection of an A-arm with a free end of a transverse leaf spring and with a support in a cross member of the vehicle body produces a front wheel suspension which ensures wheel guidance with a spring action and stabilizing the effect produced by the leaf spring.

The front axle is assembled simply and can be installed in the vehicle as a modular unit, ready to function. It consists essentially of a cross member to which the leaf spring is fastened by elastic spring bearings. A pivotable A-arm is connected with the cross member, to which arm the free end of the leaf spring can be fastened. The A-arm is also connected to a pivot bearing supporting a damper strut or suspension strut. A brake device can be connected in a simple manner to the pivot bearing. A steering gear can be pre-mounted with the cross member. This entire functional unit can be installed already assembled and adjusted in the vehicle.

For elastic support of the leaf spring in the cross member on both sides of a lengthwise central axis of the vehicle, elastic spring bearings are fastened by firmly clamping them by a spring bridge in a cross member. Matching projections and depressions in the spring bearing and on the spring bridge and/or on the cross member immovably clamp the spring bearing.

An elastic connection of the free ends of the leaf spring with the cross member is performed by bolts that enter elastic bearing blocks and are held therein. The elastic bearing blocks are glued to the leaf spring, as well as the elastic spring bearings.

According to another embodiment of the present invention, instead of the elastic bearing block with the bolts therein, an elastic bearing element is pushed onto the free end of the leaf spring. This bearing element is secured by a spring clamp to the suspension link. This embodiment is advantageous because, during assembly or disassembly, simple installation or replacement is guaranteed by in the spring clamp which can be hooked in place. In order to reduce a tendency to wobble up to the elastic spring bearings, the leaf spring has a greater width in the middle area than at its free ends.

BRIEF DESCRIPTION OF THE DRAWINGS

Other objects, advantages and novel features of the present invention will become apparent from the following detailed description of the invention when considered in conjunction with the accompanying drawings wherein:

FIG. 1 is a front view of a portion of the front axle wheel suspension;

FIG. 2 is an isolated front view of a leaf spring with an elastic spring bearing and elastic supporting bearings at the ends;

DETAILED DESCRIPTION OF THE DRAWINGS

Figure 3:
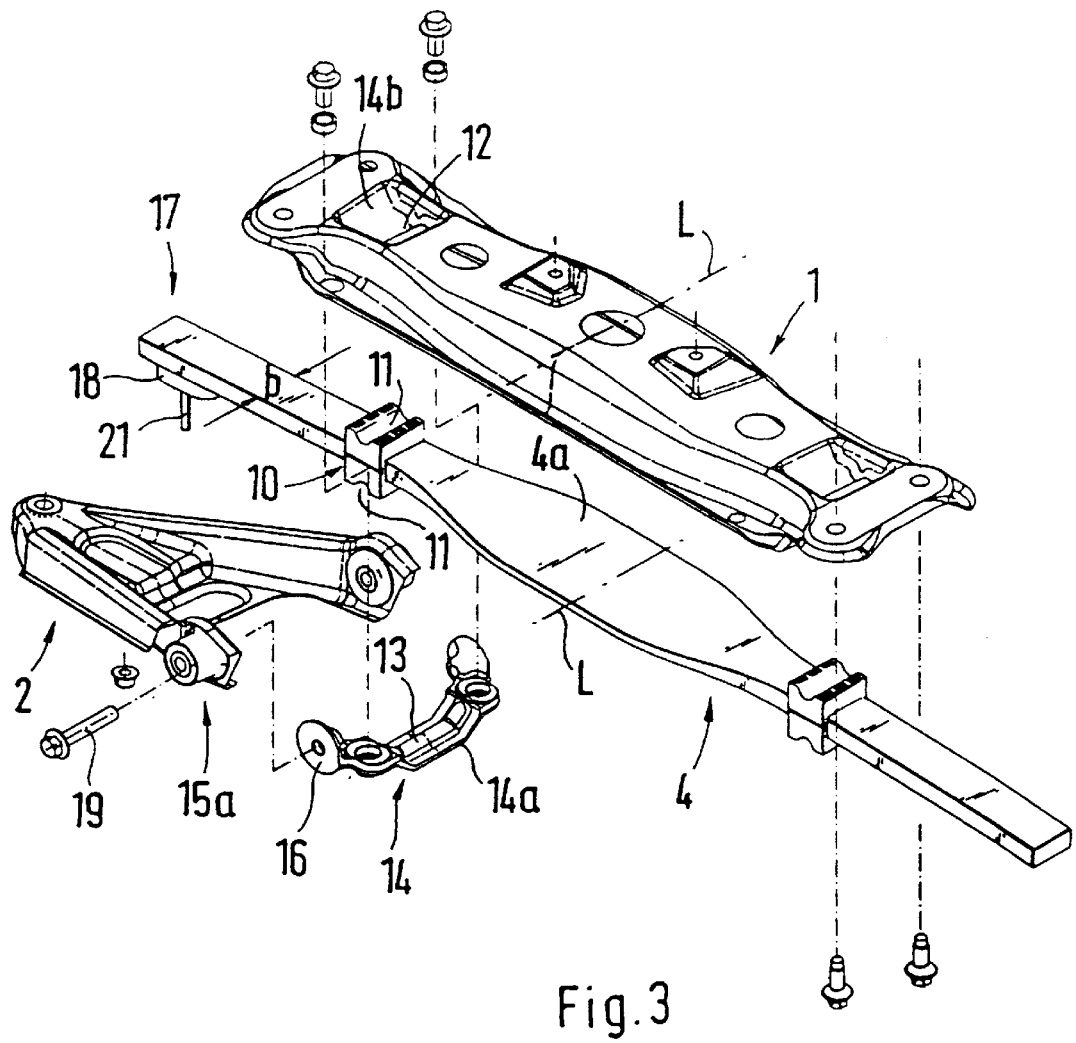
FIG. 3 is a perspective view showing the front axle with cross member, leaf spring, and A-arm.

As shown in FIG. 1, a front axle in a motor vehicle consists essentially of a cross member 1, A-arms 2, a leaf spring 4 located transversely in the vehicle, pivot bearings 5, a damper strut 6, steering gear 7, braking devices 8, and wheels 9. In the cross member 1, which is connected with the vehicle body (not shown), leaf spring 4 is secured by elastic spring bearings 10. These bearings are provided on both sides on a lengthwise central axis L of the vehicle to leaf springs 4 and secured to the upper and lower sides of leaf spring 4.

Spring bearing 10 is connected with the leaf spring 4 by, for example, gluing and has a groove-shaped depression 11 which matches a correspondingly projecting projection 12, 13 in retaining segments 14a, 14b in both the cross member 1 and in the spring bridge 14. This spring bridge 14 is connected by bolts with cross member 1. When the spring bridge 14 is secured to a cross member 1, the spring bearing 10 is clamped and is secured immovably.

As best seen in FIG. 3, eyes 16 are provided on the spring bridge 14, and the A-arm 2 is mounted to the eyes 16 with its bearings 15a so that it can pivot via pivot pins 19. One free end 17 of the leaf spring 4 abuts A-arm 2 with interposition of an elastic bearing 18. This bearing 18 is glued to the leaf spring 4 and has a threaded pin 21 connected with the A-arm 2. The A-arm 2 is secured to the pivot bearing 5 by a ball joint 20, and the damper strut 6 is fastened to pivot bearing 5.

The leaf spring 4 is brought out endwise up to the bearing 10 with the same width b (FIG. 3) and in middle part 4a has a widened section. In particular, the leaf spring 4 is made of a glass fiber composite material.

Figure 4:
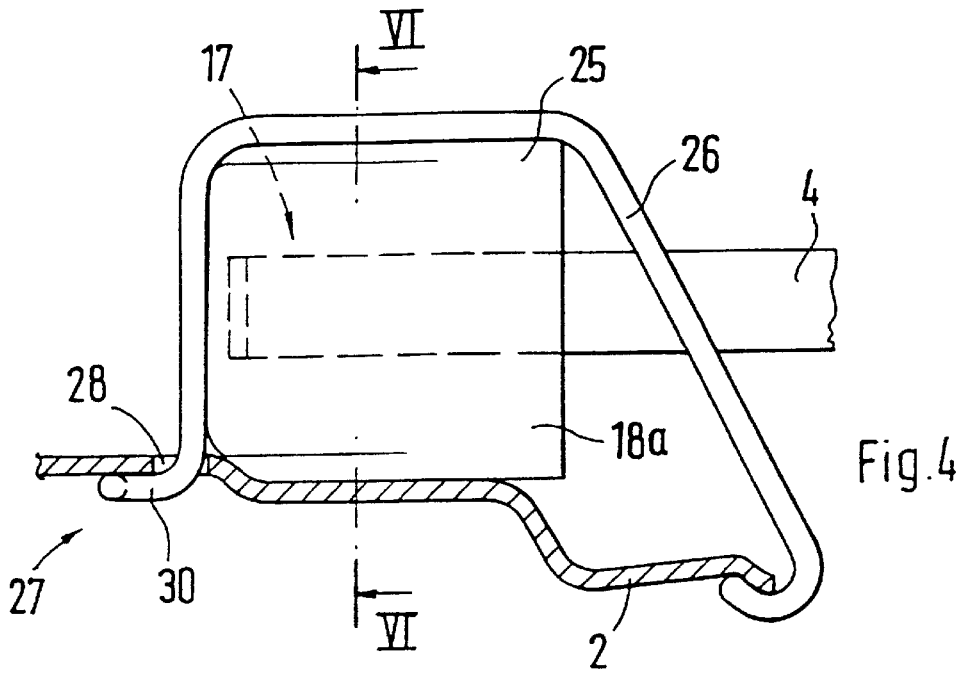
FIG. 4 is a partial cross-sectional side view of another embodiment of the elastic bearing part at the free end of the leaf spring, with the spring clamped.
Figure 5:
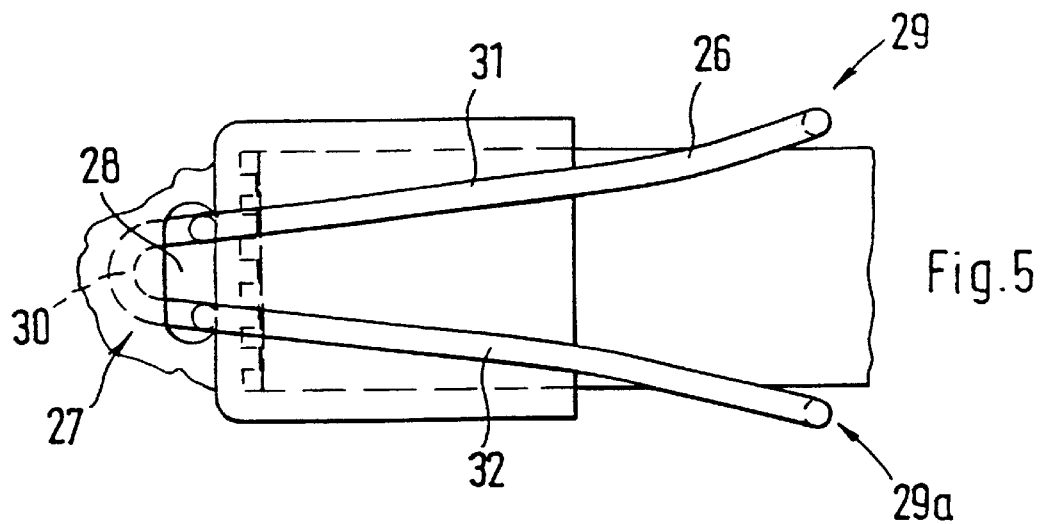
FIG. 5 is a plan view of FIG. 4.
Figure 6:
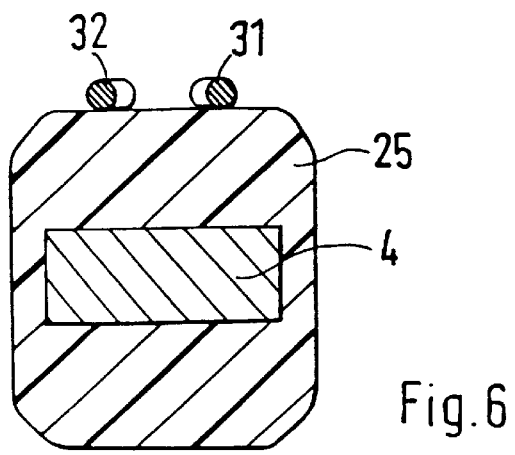
FIG. 6 is a sectional view along line VI—VI in FIG. 4.

Instead of the bearing mounting on the A-arm 2 by way of elastic bearing 18, the leaf spring according to the embodiment shown in FIGS. 4, 5, and 6, can also be secured by a clamping part 26 to the elastic bearing element 25 on the A-arm 2. The elastic bearing element 25 is located at the free end of the leaf spring 4, completely surrounding the leaf spring 4. The connection to A-arm 2 is made by the clamping part 26 clamped firmly to the A-arm 2.

The clamping part 26 is configured as a U-shaped spring clamp which fits over the bearing element 25 and can be hung by its free end 27 and the other free ends 29, 29a on the A-arm 2. The spring element 26 is secured to the A-arm 2 by a ridge 30 fitted into an opening 28 of the A-arm 2 and the two other free ends 29, 29a laterally fit the A-arm 2 of the leaf spring 4 under spring tension. With this arrangement, a leaf spring with an effective elastic element is obtained which is easy to mount, with assembly and disassembly being possible in an extremely simple manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Front axle for a motor vehicle comprising at least one leaf spring disposed transversely to a longitudinal central axis of the vehicle, said leaf spring being mounted pivotably to a cross member operatively secured to a vehicle body by elastic spring bearings located on each side of the longitudinal central axis of the vehicle, wherein free ends of the leaf spring are connected with a respective A-arm, pivotably on the cross member, the leaf spring being held in the elastic spring bearings between pivot bearings of the A-arm and the cross member.

2. Front axle according to claim 1, wherein the spring bearings surround the leaf spring and are each held by clamping between a lower surface of the cross member and a spring bridge.

3. Front axle according to claim 2, wherein the cross member and the spring bridge have projecting retaining segments for receiving the leaf spring above the spring bearings, said segments having a projection portion which engages with groove-shaped indentations of the spring bearings.

4. Front axle according to claim 1, wherein the leaf spring has a constant width for a length from the free end thereof up to the adjacent one of the spring bearings and an adjoining part between the spring bearings of greater width than the constant width.

5. Front axle according to claim 4, wherein a bolt is secured at the free end of the leaf spring and is operatively arranged on a spring element which forms an elastic support for a top portion of the A-arm.

6. Front axle according to claim 1, wherein the leaf spring is composed of glass-fiber composite material.

7. Front axle according to claim 5, wherein the cross member with the associated leaf spring, the spring bearing, the elastic support, a suspension strut with a braking device, and a steering gear constitute a functionally-ready modular unit.

8. Front axle according to claim 1, wherein a surrounding elastic bearing element is arranged at a free end of the leaf spring and is secured by a clamping part on the A-arm.

9. Front axle according to claim 8, wherein the clamping part is a spring element which is suspended by one end thereof in an opening of the A-arm and grippingly holds the A-arm with another end thereof.

10. Front axle according to claim 8, wherein the spring element is a U-shaped spring clamp configured to fit around the bearing element and having a ridge configured to be suspendingly held in an opening of the A-arm and legs configured to expand divergently outwardly.

* * * * *